Feb. 16, 1971   E. BODEN   3,562,941
LENTICULATED DISPLAY DEVICE
Filed July 25, 1968   3 Sheets-Sheet 1

INVENTOR
EDWARD BODEN

BY
Caesar, Rivise,
Bernstein & Cohen
ATTORNEYS.

Feb. 16, 1971  E. BODEN  3,562,941
LENTICULATED DISPLAY DEVICE
Filed July 25, 1968  3 Sheets-Sheet 2

INVENTOR
EDWARD BODEN

BY
Caesar, Rivise,
Bernstein & Cohen
ATTORNEYS.

Feb. 16, 1971  E. BODEN  3,562,941

LENTICULATED DISPLAY DEVICE

Filed July 25, 1968  3 Sheets-Sheet 3

INVENTOR
EDWARD BODEN
BY
*Caesar, Rivise,*
*Bernstein & Cohen*
ATTORNEYS.

United States Patent Office 3,562,941
Patented Feb. 16, 1971

3,562,941
LENTICULATED DISPLAY DEVICE
Edward Boden, Philadelphia, Pa., assignor to Daylight Animation, Inc., Philadelphia, Pa., a corporation of Pennsylvania
Filed July 25, 1968, Ser. No. 747,515
Int. Cl. G09f 13/36
U.S. Cl. 40—106.53                                  4 Claims

ABSTRACT OF THE DISCLOSURE

A decalcomania for use with a lenticular sheet in an optically changeable display device comprising a carrier sheet and artwork positioned thereon. Said artwork comprises a plurality of sets of equally spaced parallel lines. Each set of parallel lines will depict a different configuration when positioned behind a lenticular sheet. The carrier sheet for the artwork includes means for securement of the sheet and its associated artwork onto a rigid supporting sheet.

---

Another aspect of this invention comprises an optically changeable display device comprising a circular transparent lenticular sheet and a circular sheet of artwork. The lenticular sheet is arranged in sectors with each sector comprising a plurality of parallel convex ribs forming spaced parallel grooves at their loci of intersection. The artwork comprises a plurality of sectors of spaced sets of parallel lines.

This invention relates to changeable signs in which artwork is viewed through a transparent lenticular sheet consisting of lenses in the form of sequential convex ribs. The invention is particularly adapted to be used in signs for outdoor display, especially when animation or color changes are desirable in bright daylight.

Heretofore, outdoor displays generally required flashing lights, complex circuitry, and complicated mechanical devices to produce changeable characters, motion effects and animation, and were limited mostly to nighttime effectiveness. It is one object of this invention to provide a sign capable of producing alternating characters as well as complex and intricate motion and color effects using optical rather than illuminated electrical or mechanical principles to effect the same.

Accordingly, in one aspect of this invention, an optically changing display is obtained by providing relative rotational movement between a circular form of artwork and a circular form of a lenticular sheet. In the prior art, lenticular sheets were used in square or rectangular configuration and the changing appearance of the artwork was accomplished by having the viewer walk past the lenticular sheet or by moving the lenticular sheet relative to the artwork positioned behind it. Alternatively, the lenticular sheet could be maintained in a stationary position and the artwork could be moved behind the sheet.

In the prior art lenticular signs, the artwork was generally applied to a backing sheet by use of a silk screen process. The silk screening is a tedious and time consuming process and could only be carried out professionally. Thus, when a particular user of a lenticular sign wished to change the artwork of the sign, it was necessary to obtain the services of a professional artist to do the artwork for the new sign.

In one aspect of this invention, artwork for use with lenticular sheets is produced in the form of decalcomanias. Therefore, the user of a lenticular display device will be furnished with a kit whereby he can change the artwork by affixing the decalcomanias to a backing sheet and then using the backing sheet with the artwork applied in the lenticular display device. In this way, the user of a lenticular display device can easily and inexpensively change the artwork for the device without the necessity of having a professional artist change the artwork.

It is therefore an object of this invention to provide a novel lenticular sign wherein there is a relative rotational movement between the artwork and the lenticular sheet, thereby obtaining a unique display device.

It is another object of this invention to provide rectangular artwork in the form of decalcomanias for use in a lenticular display device.

These and other objects of this invention are accomplished by providing a decalcomania for use with a lenticular sheet in an optically changeable display device comprising a carrier sheet and artwork positioned thereon, said artwork comprising a plurality of sets of equally spaced parallel lines, with each set of parallel lines adapted to depict a different configuration when positioned behind a lenticular sheet, and said carrier sheet including means for securement of the sheet and its associated artwork onto a rigid supporting sheet.

In another aspect of this invention, there is provided an optically changeable display device comprising a transparent lenticular sheet and a circular sheet of artwork, said lenticular sheet being arranged in sectors with each sector comprising a plurality of parallel convex ribs forming spaced parallel grooves at their loci of intersection, and said artwork comprising a plurality of sectors of spaced sets of parallel lines.

Other objects and many of the attendant advantages of this invention will be readily appreciated as the same becomes better understood by reference to the following detailed description when considered in connection with the accompanying drawings wherein.

Figure 1:
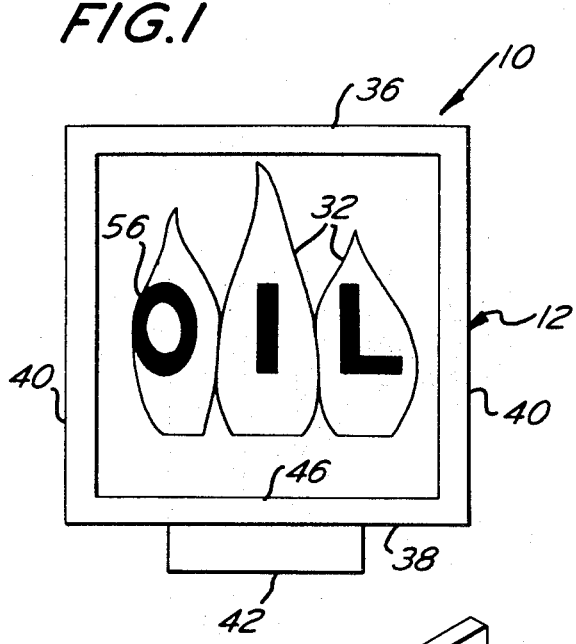
FIG. 1 is a front elevational view of an optically changeable sign embodying this invention, and showing a first appearance of the artwork.

Referring now in greater detail to the various figures of the drawings wherein similar reference characters refer to like parts a lenticulated display device embodying the present invention is generally shown at 10 in FIG. 1. As seen in FIGS. 1 to 4, device 10 basically comprises a housing 12, a lenticular sheet 14, a supporting sheet 16 having artwork 18 positioned thereon, and a backing plate 20.

Lenticular sheet 14 is similar to lenticular sheets of the prior art, and is made from a transparent material such as glass or plastic. Any transparent plastic having good optical qualities can be used, such as acrylics (Lucite or Plexiglas), butyrates (U-Vex) or polystyrene. The lenticular sheet includes a planar face 22 (FIG. 3) and an opposing face formed from a plurality of parallel ribs 24 of convex cross-section. Each rib forms a semi-cylindrical lens, and the ribs are separated by parallel grooves 26 at their loci of intersection.

Depending on the nature of the application, the number of ribs per foot of the sheet may be varied as well as the degree of curvature of each rib and the thickness of the sheet. It will be understood, as is the common practice in the art, that the object to be viewed through the ribbed lenses will be at the focal point of the lenses.

Figure 3:
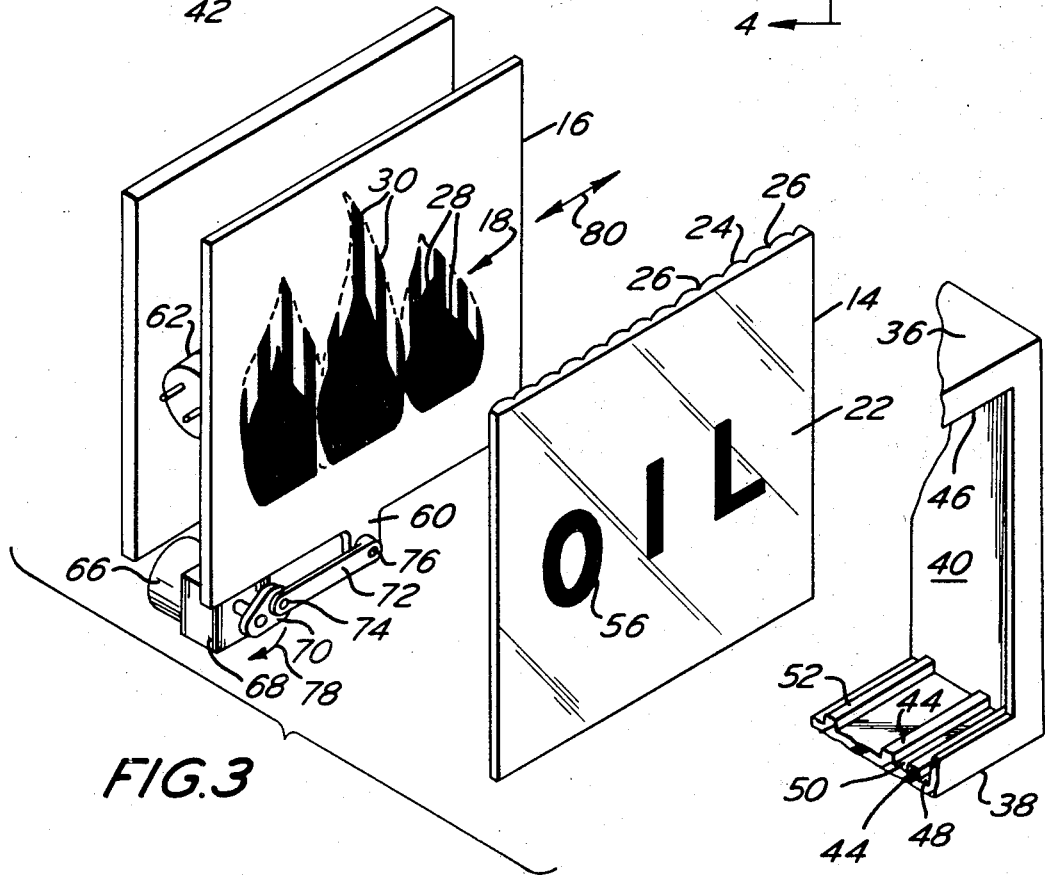
FIG. 3 is an exploded view of the elements comprising the sign of FIG. 1.

The artwork is generally shown at 18 in FIG. 3. As in the prior art, the artwork comprises a prearrangement of lines or bands of the same or different color whereby changeable characters are provided due to relative movement of a viewer before the transparent lens sheet 14. Alternatively, the viewer can remain stationary and the lens sheet can be moved relative to the artwork or the sheet containing the artwork can be moved relative to the lens sheet.

In normal usage, the artwork comprises at least two sets of equally spaced parallel lines. Each set of lines will give a different pictorial representation when viewed through the lenticular sheet.

Additionally, in normal usage the width of each line is equal to one-half the width of a lens 24. Thus, by relative movement between the viewer and the position of the lens relative to the artwork, the appearance of the artwork will optically change from that depicted by one set of lines to the artwork depicted by the second set of lines.

Referring again specifically to the artwork shown at 18 in FIG. 3, the first set of lines 28 is used for depicting a relatively small or low flame. A second set of lines 30 is used for depicting a relatively high flame. As seen in FIG. 3, the low set of lines 28 appears as a solid flame because there is an overlap between lines 28 and lines 30. When used to depict a flame, all of the lines can be a flame color.

Figure 2:
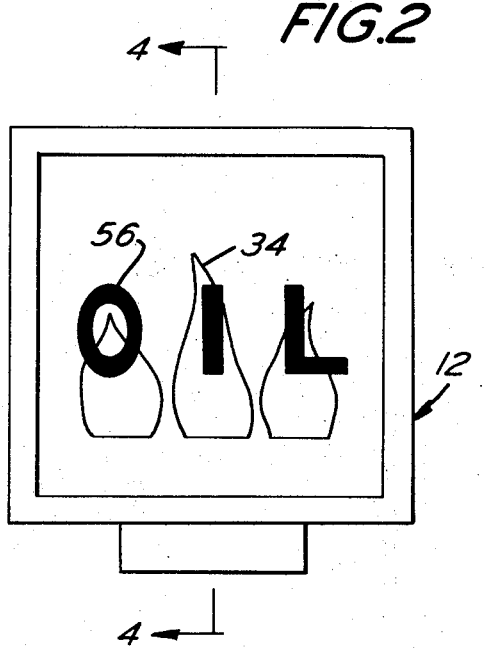
FIG. 2 is a front elevational view of the sign of FIG. 1, but showing a second appearance of the artwork.

The varying appearance of the two sets of lines is shown in FIGS. 1 and 2. Thus, the appearance of the flame when the lenticular sheet is set relative to the viewer to focus upon lines 30 will be the large flame shown at 32 in FIG. 1. The appearance of the lines when the lenticular sheet is set for viewing the second set of lines 28 will be the small flame shown at 34 in FIG. 2.

As is well known in the art, due to the optics of using the lenticular sheet 14, the flames will appear as being continuous solid masses, rather than being the spaced lines shown in FIG. 3. This continuous appearance is formed in all lenticulated optically changeable devices.

If desired, the lines can be altered to have certain portions of the flame appear at their maximum height while others will appear at their minimum height for a given viewing or position of the lenticulated sheet. Thus, by using the artwork shown at 18 in FIG. 3, or variations of the same, and by continually reciprocating the lenticulated sheet 14 or the sheet 16 supporting the artwork, a continual appearance of flickering flames can be obtained.

The artwork shown in FIG. 3 is applied through the use of the decalcomanias of this invention, as will be explained in further detail with respect to FIGS. 8 and 9.

Figure 4:
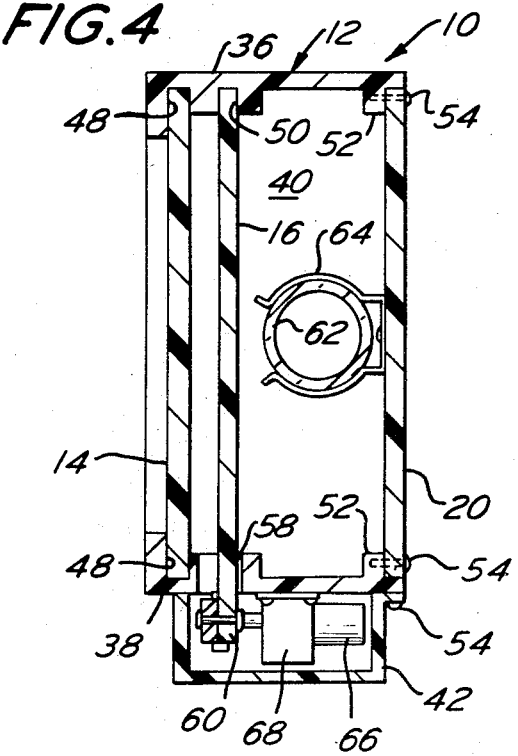
FIG. 4 is an enlarged sectional view taken along the line 4—4 of FIG. 2.
Figure 5:
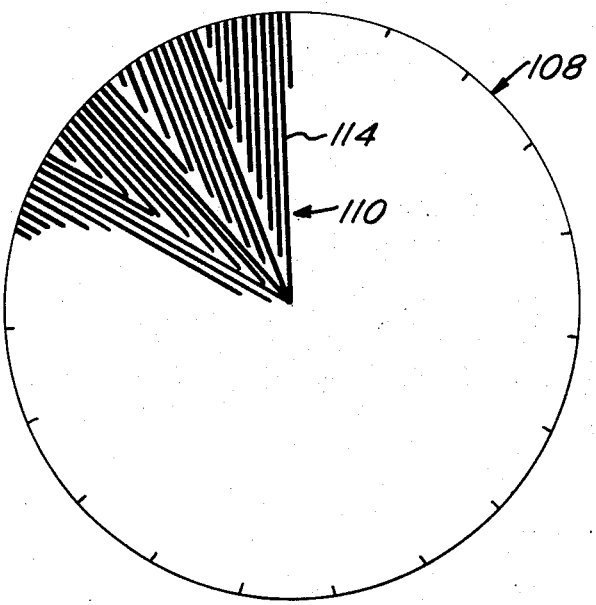
FIG. 5 is a front elevational view of the artwork used in the rotatable display device of this invention.

Housing 12 comprises a top wall 36, a bottom wall 38, side walls 40 and a base 42. The top and bottom walls include a plurality of inwardly projecting ribs 44. Additionally, a rim 46 projects around the entire front of housing 12. Channels 48 are formed between lips 44 and the adjacent rim 46, and channels 50 are formed between adjacent lips 44. Inwardly projecting lips 52 on walls 36 and 38 are positioned adjacent the rear of housing 12. As seen in FIG. 4, backing plate 20 is secured to lips 52 by any suitable means, such as pins or screws 54.

In the assembly of device 10, lenticular sheet 14 is positioned in channels 48 with the arcuate lenses 24 facing inwardly. The outer planar face of sheet 14 is provided with indicia 56 which is adapted to identify the name of a product, the name of the vendor, or any other information normally used in advertising or display media.

In the embodiment shown, the device is used in connection with the sale of oil. Supporting sheet or plate 16 is positioned in channel 50. The center of the channel is provided with a longitudinal opening 58 (FIG. 4) through which a downwardly projecting tab 60 of plate 16 will pass. Plate 16 is provided with a translucent light diffusing coating on its rear side, that is, the side opposite the artwork 18. A light means, which in the embodiments shown, is a fluorescent tube 62, is secured on backing plate 20 by a suitable bracket 64. The light means is in turn connected to a source of current.

Base 42 has mounted therein a motor 66 and gearing 68. A crank arm 70 is secured on the output shaft of gearing 68. The rod 72 is rotatably mounted on crank arm 70 and tab 60 by pins 74 and 76, respectively.

Device 10 is used by turning on light 62 and starting motor 66. This in turn will cause the rotation of crank arm 70 in a clockwise direction, as seen by arrow 78 in FIG. 3. The rotation of the crank arm 70 will cause sheet 16 having the translucent backing to reciprocate in a horizontal plane within channels 50, as shown by arrow 80 in FIG. 3. The reciprocation of the sheet 16 will optically change the appearance of the artwork 18.

Thus, the artwork, which is illuminated by light 62, will change from the appearance shown at 32 in FIG. 1 to the appearance shown at 34 in FIG. 2. In this way, there is provided an animated display device especially adapted for the promotion and sale of oil heat. The reciprocation of the artwork behind the lenticular sheet will give the appearance of flickering flames behind the word oil.

Various modifications can be made in the device 10 while still utilizing the concept of this invention. Thus, in the embodiments shown, the lenticular lenses are positioned inwardly. The purpose of doing this is to give a wider range of viewing area for the lenses. However, the device can be operated in substantially the same manner by having the lenticular ribs or lenses 24 positioned outwardly. In this case, the word oil or other indicia can be positioned on a separate sheet placed in front of the lenticular sheet. In most instances, however, the most efficient way of carrying out this invention would be to have the lenticular sheet positioned as shown in FIGS. 1 to 4.

As another alternate embodiment, the illuminating source 62 can be eliminated, and illumination for the device can be through natural light through the front of the device or by artificial illumination focused on the front of the device.

Figure 8:
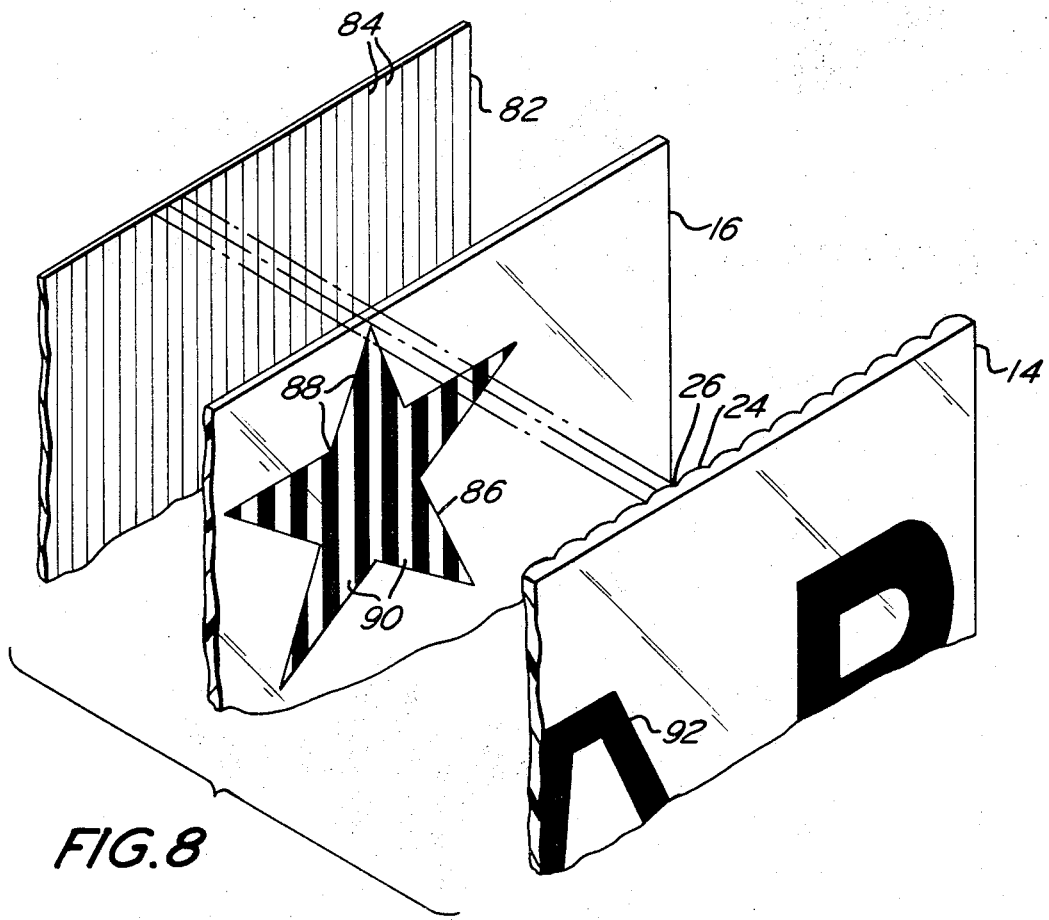
FIG. 8 is an exploded partial perspective view showing the method of forming an advertising display device using the decalcomanias of this invention.
Figure 9:
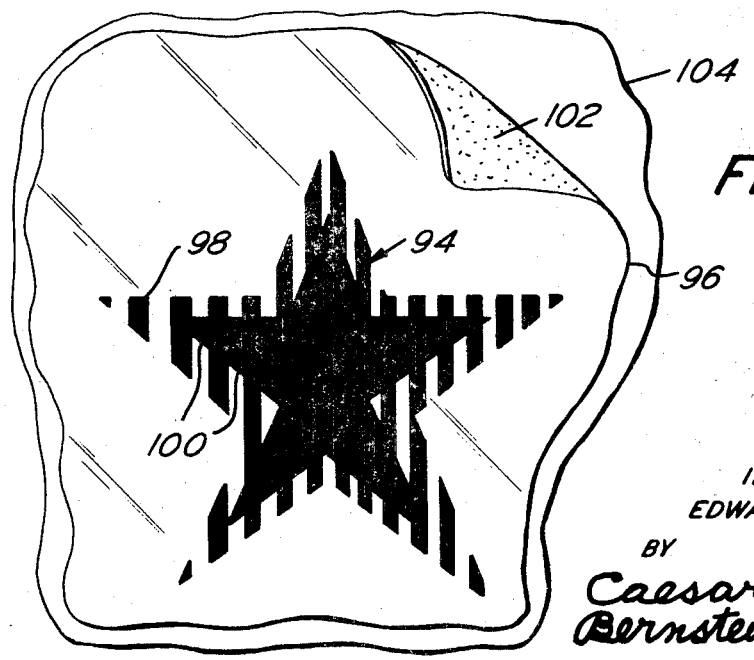
FIG. 9 is a front elevational view of a decalcomania usable in this invention.

The manner of preparing the sheet 16 containing the artwork is shown in FIGS. 8 and 9. As seen therein, sheet 16 is a transparent sheet of plastic. Any suitable plastic may be used, such as acrylics, butyrates or polystyrene. The transparent sheet 16 is placed over a lined sheet of paper 82. The lines 84 on the paper are parallel and equally spaced. As indicated in FIG. 8, the spacing of the lines 84 is at the rate of two lines for every groove 26 between ribs 24. Artwork 86 is applied to transparent sheet 16 by aligning the edge of sheet 16 with the edge of paper 82. Thereafter, the artwork is placed on the sheet 16 by having sets of lines 88 aligned between two lines 84 on the paper sheet. The width of lines 88 is exactly the same as the distance between two lines 84. Likewise, the blank openings 90 between lines 88 will also be aligned with alternating pairs of lines 84.

In the embodiment of the invention shown in FIG. 8, the indicia 92 on the lenticular sheet 14 will consist of the word Star, which may be a trade name or trademark of a particular company. After the artwork 86 has been placed on the sheet 16 by aligning the artwork with the paper sheet as described above, the paper is removed and the back face of sheet 16 has applied thereto a translucent coating. When the lenticular sheet 14 is used with the artwork 86, and the reciprocable motion of device 10 is imparted, the appearance of the artwork will be that of an appearing and disappearing star. This will aid in dramatizing the trade name or trademark Star which appears on the front face of the lenticular sheet 14.

One of the unique features of this invention is the manner of applying the artwork to the backing sheet 16. The procedure of applying the artwork in the prior art has been to use a silk screen printing process where multiple copies of artwork are to be made. Other processes such as offset or letterpress could be used. However, in all of these processes the artwork had to be professionally prepared. In this invention there is provided a decalcomania form of artwork which permits the user of the lenticular display device to change the artwork himself without any outside help. Thus, as seen in FIG. 9, artwork 94 is applied on a transparent backing sheet 96. The artwork comprises a spaced series of bands 98 which will produce a large star and a second spaced series of bands 100 which will produce a small star. The artwork is printed on the backing sheet 96 by any of the printing processes described above, such as silk screen, letterpress or offset printing. The transparent backing sheet can be any of the durable films available today such as Mylar (polyethylene terephthalate) or vinyls, such as Scotchcal, which is a special transparent marking film sold by the 3M Company. The back of sheet 96 is provided with an adhesive coating 102.

In the embodiment shown, coating 102 is a pressure release, pressure sensitive adhesive. A suitable adhesive having this property is that sold under the trademark Controltac by the 3M Company. One of the properties of this type of adhesive is that it is substantially transparent and has very little initial tackiness. However, when an object having the adhesive is placed against a second object, and pressure is applied against the object having the adhesive, there will be a flow of pressure sensitive adhesive thereby obtaining an excellent bond between the two objects. Thus, pressure is needed to release the pressure sensitive adhesive. A removable protective sheet 104 is placed against the adhesive 102.

The decalcomania shown in FIG. 9 is applied in the manner shown in FIG. 8. Thus, sheet 16 is aligned with paper backing 82. Sheet 104 is then removed from the back of sheet 96 and the artwork on backing sheet 96 is then aligned with the lines on paper 82. When the proper alignment is accomplished, a plastic blade is then rubbed across the front of sheet 96, thereby releasing the pressure sensitive adhesive and obtaining a rigid securement of sheet 96 and its associated artwork on its supporting sheet 16. After the sheet 96 has been secured in place, the back of sheet 16 has applied thereto a translucent coating which can be any material which will give the desired effect, such as paint or lacquer. Alternatively, a separate translucent sheet can be affixed to the back of sheet 16.

When the display device is made in the manner described above using the artwork 94, the appearance will be a continually growing and shrinking star. If desired, artwork 86 can be used in conjunction with artwork 94 thereby obtaining the dual effect of enlarging and decreasing stars and appearing and disappearing stars. If some of the bands of the artwork are not aligned with the lines 84, a varied effect of blinking stars can be obtained. Thus, there will continually be appearing and disappearing stars as the artwork is reciprocated behind lenticular sheet 14.

The decalcomania of FIG. 9 has been described as being produced having a pressure release, pressure sensitive coating. However, other adhesive coatings, such as the normal pressure sensitive adhesive or solvent activatable adhesive can be used. Additionally, the decalcomania can be in the form of the water-release type, such as those being presently used on automobile windows for the display of college or university names and emblems.

Figure 7:
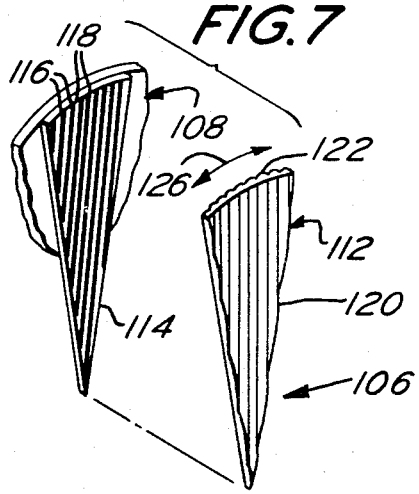
FIG. 7 is a partial exploded perspective view of a changeable display device including the artwork and lenticular sheet of FIGS. 5 and 6.

A modified embodiment of this invention is generally shown at 106 in FIG. 7. Device 106 comprises a circular sheet 108 containing artwork 110 and a circular lenticular sheet 112. Circular sheet 108 is formed from a rigid transparent plastic having a translucent coating on its rear side or from a translucent rigid plastic. Other rigid backing sheets can be used, such as wood or metal.

The artwork 110 is formed from a group of sectors 114. The sectors can be cut from a sheet having equally spaced sets of bands 116 and 118. Bands 116 are of a different color from those of bands 118. The sectors are in the form of decalcomanias similar to that shown in FIG. 9. The sectors are secured to the backing plate 108 in such a manner that their centerlines are not radially extending, but are inclined slightly away from a radially extending line. The entire sheet 108 is covered with the sectors 114. Instead of cutting individual sectors, the entire sheet of artwork 110 can be printed as a complete circle. However, it will still be arranged in sectors.

Figure 6:
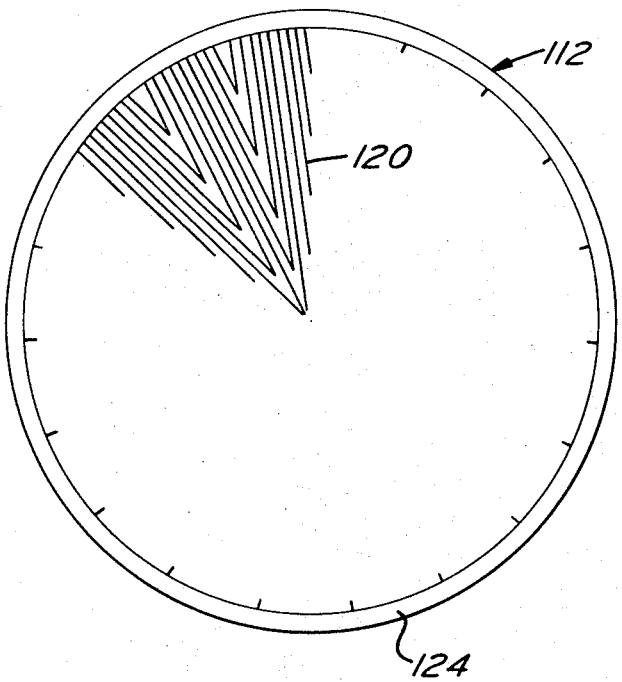
FIG. 6 is a front elevational view of a lenticular sheet usable in the rotatable display device of this invention.

The lenticular sheet is formed from a plurality of sectors 120 of transparent lenticulated plastic or glass. Ribs 122 project inwardly toward the artwork. The sectors 120 are arranged in circular form in the same manner as artwork 110. However, as seen in FIG. 6, the centerlines of each sector are radially extending. The secured lenticular sheet is molded into the sector form shown, and if desired, a decorative circular rim 124 can be added.

The device of FIG. 7 is used by rotating the artwork relative to the lenticular sheet. As shown by arrow 126 the rotation can be in either direction and can comprise alternate rotation in a clockwise and then a counterclockwise direction. The rotation produces a constantly changing pattern for the artwork. At times the change appears to be first an increasing diameter helix followed by a decreasing diameter helix. The overall effect is a continually increasing and decreasing diameter of design. If desired, indicia can be placed on the front face of the lenticular sheet.

The device of FIG. 7 can be made in extremely large diameters for use in outdoor display. For instance, when using a diameter of four feet for the lenticular sheet, the ribs 122 can each have a diameter of one-half inch. Accordingly, each band 116 and 118 will have a width of one-quarter inch. The device can be used for providing an eye-catching display for use behind a word sign for any particular vendor.

Particularly advantageous uses of the device of FIG. 7 would be for signs at gas stations, on billboards or other locations where a visually dramatic display is desired in daylight, especially where zoning regulations or ordinances prohibit the use of signs which rotate around a vertical axis.

Thus, the device will provide an eye-catching, constantly changing display without the necessity of providing any artificial lighting or noticeable moving parts. Daylight alone with internal rotation of artwork are sufficient to obtain the desired design changes.

Although only a few variations in artwork have been described, it is to be understood that many other forms of artwork can be used. Thus designs of constantly changing motion or color can be effected. Additionally, animated objects, such as horses, can be used, and an appearance of movement can be obtained.

Motion can be imparted to the sheet supporting the artwork on the lenticular sheet by any means known to the art. Instead of using the crank arm 72, the reciprocating motion can be obtained by using rack and pinion gearing and a reversible motor.

Without further elaboration, the foregoing will so fully illustrate my invention that others may, by applying current or future knowledge, adopt the same for use under various conditions of service.

What is claimed as the invention is:

1. An optically changeable display device comprising a lenticular sheet and a circular sheet of artwork, said lenticular sheet being arranged in sectors with each sector comprising a plurality of parallel convex ribs forming spaced parallel grooves at their loci of intersection, and said artwork comprising a plurality of sectors of spaced sets of parallel lines, said sheet of artwork being positioned behind said lenticular sheet, whereby said artwork will give an optically changing appearance when viewed through said lenticular sheet.

2. The display device of claim 1 wherein said circular sheet of artwork comprises a supporting sheet having said artwork positioned thereon, said artwork being affixed by a decalcomania comprising a carrier sheet, with said artwork positioned on the surface of said carrier sheet, and said carrier sheet being secured to said supporting sheet.

3. The display device of claim 1 wherein said circular sheet of artwork is adapted to be rotated behind said lenticular sheet.

4. The display device of claim 1 wherein the centerline of each sector of ribs is radially extending, and the centerline of each sector of artwork is inclined relative to a radially extending line.

References Cited
UNITED STATES PATENTS

| | | | |
|---|---|---|---|
| 1,475,430 | 11/1923 | Curwen | 40—137 |
| 2,058,581 | 10/1936 | Fegan | 40—106.53 |
| 2,099,243 | 11/1937 | Taaffe | 40—132(F) |
| 2,265,355 | 12/1941 | David | 40—106.53 |
| 2,272,947 | 2/1942 | Hotchner | 40—106.53 |
| 2,524,286 | 10/1950 | Dreyer | 117—3.1X |
| 3,276,933 | 10/1966 | Brant | 117—3.1X |
| 3,421,805 | 1/1969 | Rowland | 40—106.53X |
| 3,437,401 | 4/1969 | Siksai | 40—106.52X |
| 3,459,626 | 8/1969 | Morgan | 117—3.1X |

ROBERT W. MICHELL, Primary Examiner

R. CARTER, Assistant Examiner